United States Patent [19]
Karplus et al.

[11] 3,748,755
[45] July 31, 1973

[54] CIRCUIT BASE MODEL

[75] Inventors: Robert Karplus, Orinda; Marshall A. Montgomery, Pleasant Hill, both of Calif.; Carl F. Berger, Livonia, Mich.

[73] Assignee: The Regents of the University of California, Berkeley, Calif.

[22] Filed: June 19, 1972

[21] Appl. No.: 259,536

[52] U.S. Cl. .............................................. 35/19 A
[51] Int. Cl. ............................................ G09b 23/18
[58] Field of Search ........................... 35/19 A, 35 J

[56] References Cited
UNITED STATES PATENTS
| | | | |
|---|---|---|---|
| 2,722,777 | 11/1955 | Simpson | 35/19 A UX |
| 3,008,245 | 11/1961 | Meuche | 35/19 A |
| 3,203,114 | 8/1965 | Adler | 35/19 A |
| 3,374,556 | 3/1968 | Brown | 35/19 A |

FOREIGN PATENTS OR APPLICATIONS
| | | | |
|---|---|---|---|
| 34,213 | 12/1964 | Germany | 35/35 J |

Primary Examiner—Harland S. Skogquist
Attorney—Charles Hieken

[57] ABSTRACT

Principles of electricity, magnetism and electrochemistry, together with more fundamental concepts of scientific method and abstract reasoning, can be taught to children with the aid of simple, economic models. Disclosed here are a standard repeating unit of circuit board in the form of a raised platform which can be mated edge-to-edge with like circuit boards for building-up circuits or stacked in a nesting arrangement for storage purposes and which is of economical one piece formed insulating plastic sheet, yet provides appropriate mountings for a battery, terminal strips, terminal clips, electrolytic cell, and galvonometer; the corresponding electrical, magnetic or electrochemical circuit elements, which form a variety of complete assemblies therewith; and the resultant assemblies.

7 Claims, 3 Drawing Figures

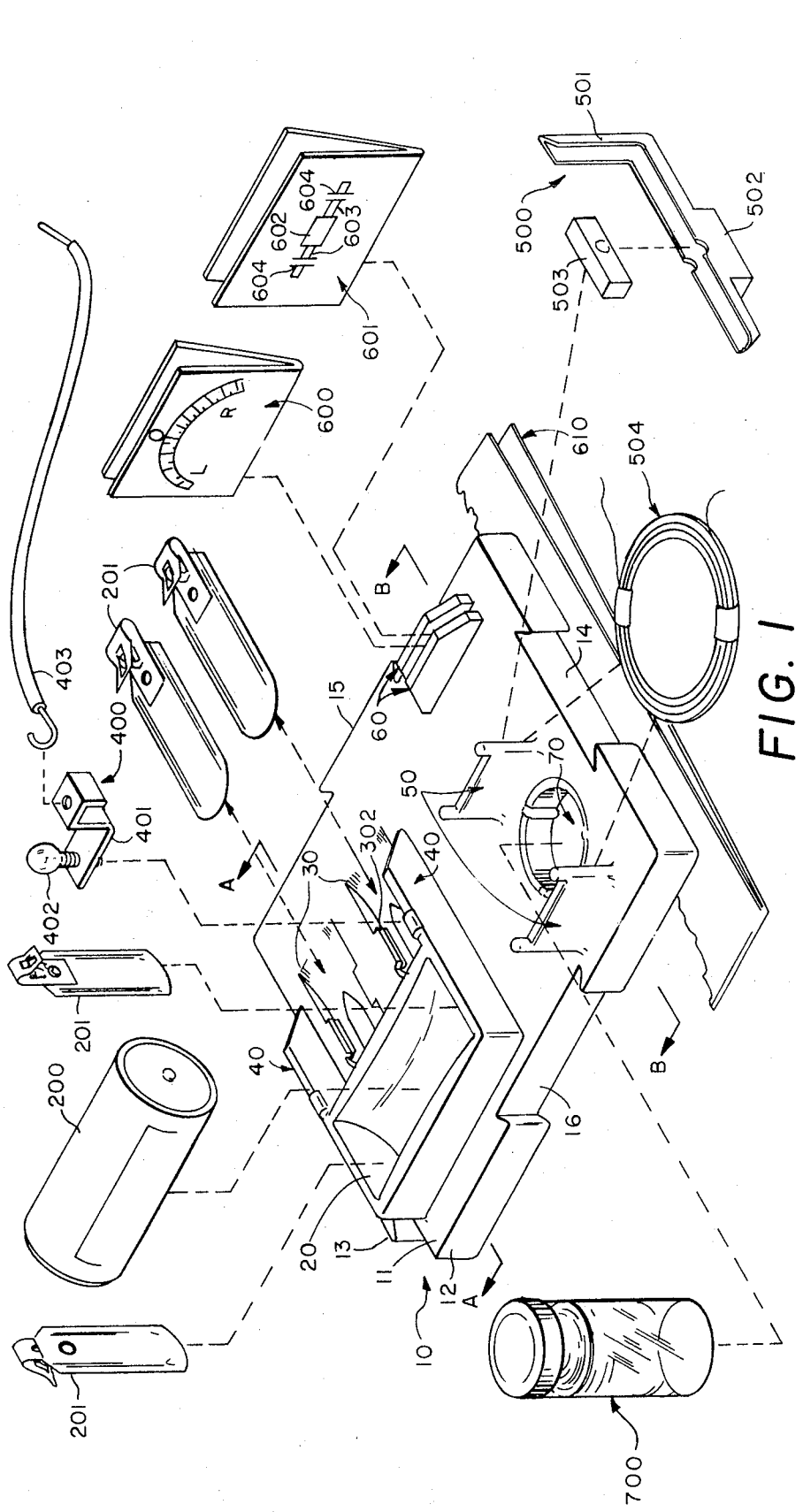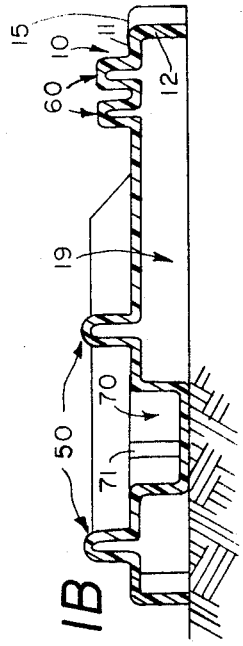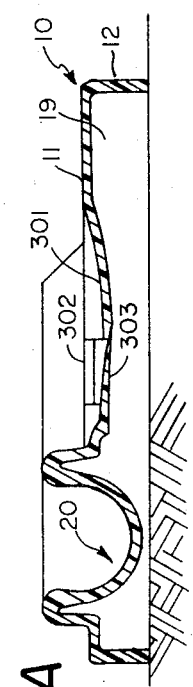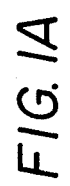
FIG. 1
FIG. 1A
FIG. 1B

CIRCUIT BASE MODEL

The invention described herein was made in the course of or under a grant from the National Science Foundation, an agency of the United States Government.

The present invention relates to educational/demonstration apparatus for use in connection with demonstrating fundamental phenomena of electricity, magnestism and electrochemistry. Reference is made to the copyrighted book "Model: Electric and Magnetic Interactions – Teachers' Guide," prepared by the Science Curriculum Improvement Study, copyrighted in 1971 by The Regents of the University of California, Berkeley, Calif., first printing, Aug. 1971 and published by Rand McNally and Company, P.O. Box 7600, Chicago, Ill. 60680, the said book being incorporated herein by reference as though written out at length herein, and including all text and illustrations therein.

BACKGROUND OF THE INVENTION

Central to modern science is the view that changes take place because objects interact in reproducible ways under similar conditions. There is a relation among objects or organisms that do something to one another thereby bringing about a change. Children can easily observe and use the evidence presented by simple models to comprehend such interaction — as for instance by observing a magnet picking up a steel pin and understanding the underlying interaction. As the above cited book explains, simple apparatus demonstrating electrical, magnetic and electrochemical phenomena can provide reinforcing experiences of this type to advance the student from a dependence on concrete experience to the ability to think abstractly and thereby identify the conditions under which interaction occurs and predict its outcome. In addition, the children learn something about electricity, magnetism and electrochemistry and the application thereof directly.

In order to meet the needs of such educational process, demonstration and experiment apparatus must be available which is flexible — capable of a variety of uses rather than dedicating specific components to specific uses — and must also be inexpensive and readily storable.

It is an important object of the present invention to meet one or more, and, preferably all simultaneously, of the foregoing requirements in apparatus.

It is a further important object of the invention to meet the needs of children regarding ease of assembly and diassembly of such apparatus consistent with the foregoing series of objects.

It is a further important object of the invention to provide apparatus of the class described which is simple and leads children to correct handling procedures, consistent with one or more of the foregoing objects.

SUMMARY OF THE INVENTION

A repeating series of like raised platform units is provided. Each such platform unit has a platform mount and support means raising it up above a table or other surface upon which it can rest — preferrably a horizontal flat surface. In preferred and distinctly advantageous embodiments, the support means take the form of a turned edge of a sheet platform.

The edges of the platform unit have locking protrusions or recesses for mating to the edges of like units, in demountable self-locking fashion. As used herein for various purposes, "demountable" means that two members can be fitted together for locking without forming a permanent bond and disassembled by mere pulling apart removal,and "self-locking" refers to the nature of the bond therebetween which is a frictional engagement as a result of mere assembly or an interlock as a result of mere assembly without additionally inserted latches or locks or the like.

The platform has a well for a battery — usually a D-size dry cell cylindrical, alkaline battery (such as the common flashlight battery) and end terminals therefor. The platform has at least one terminal holding groove on the platform mount which is constructed and arranged to hold a metal terminal strip in demountable self-locking relation therewith. The platform also has means to form at least one raised terminal mount above the platform for holding a terminal clip in demountable, self-locking relation which means are closely spaced to the above mentioned groove so that the terminal clip can support an electrical load device (such as a bulb) in contact with said terminal strip to complete a circuit.

The platform also has means thereon to form a multiple point seat rocking mount for an elongated rocker member. A rocker member with a needle at its end and carrying an integral magnet can be placed on the mount and an electromagnetic coil can be wrapped around the mount to provide a simple galvanometer movement. The platform also has a well for holding electrolytic fluid, either directly or by holding a vial which holds the electrolytic fluid so the students can make various devices — electroplating tanks, primary batteries, etc.

The platform also has means mounted thereon which will support a folded stiff paper sheet which can have a trace of a meter scale thereon with the plane of the paper sheet being orthogonal, and preferably perpendicular, with respect to the direction of elongation of the rocking bar which supports the meter needle.

Standard classroom kits can be provided including a number of such board apparatus and corresponding amounts of terminal strips, terminal clips, batteries, rocking bar needles and electroyte holding vials. To a large extent, the accessory materials can be homemade in the classroom to the extent that there are shortages in the kits for a given class. Paper clips can provide useful terminals or conductors and paper is always available to provide meter faces or circuit cards.

The students can cooperate in teams by assembling their respective platform units to build up large circuits.

The units rest stably on table tops and are substantially compatible. The experiments can be contained in a single platform or overlap several mated platforms.

The platform units are — in preferred and distinctly advantageous embodiments — one piece electrical insulating thermoplastic sheets which are vacuum formed or injection molded. Preferably extensions of the formed sheet above and below the platform mount are hollow to accommodate nesting when the units are stacked. The units also are constructed and arranged to facilitate fabrication, consistent with the foregoing functions. For example, the spacing of parts reflects the need to avoid webbing over between deeply drawn sections through appropriate spacing on the platform. These and other matches of economic fabrication and educational purpose afford a highly practical and effective apparatus for the above stated purposes.

Numerous other features, objects, and advantages of the invention will become apparent from the following specification when read in connection with the accompanying drawing in which:

BRIEF DESCRIPTION OF THE DRAWINGS

FIG. 1 is an exploded view of the raised platform mount apparatus and accompanying holder apparatus according to invention and the various mating accessories which go into the various holders to define various experiments;

FIG. 1A is a transverse sectional view along A—A as indicated in the isometric exploded view of FIG. 1; and FIG. 1B is a transverse sectional view along the section line as indicated by the arrows B—B in FIG. 1. The arrows A—A, B—B give the viewing directions for the sections of FIGS. 1A, and 1B.

DETAILED DESCRIPTION OF PREFERRED EMBODIMENTS

With reference now to the drawing, and more particularly FIG. 1 thereof, there is shown an exploded view of a circuit board/mounting structure unit 10 and related circuit components. The circuit board unit 10 comprises a platform mount 11 raised above a supporting surface by a turned edge 12, which is turned all around the platform to form a stable mount. The platform is of elongated rectangular form and has a battery well 20 extending longitudinally along one longitudinal side thereof, two terminal strip grooves 30 and two terminal clip mounts 40 transverse to the battery well and at the other longitudinal end of the platform two rocker bar mounts 50 of slab-like form and two paper holder slabs 60, all the said slabs extending vertically above the platform and being parallel to each other and in a line extending transverse to the longitudinal direction of the platform. The slabs 50 straddle an upright cylindrical well 70.

A protrusion 13 is located on the front transverse edge of raised platform apparatus unit 10, and a protrusion 15 is located on the right longitudinal edge of the unit. A recess 14 is located on the rear transverse edge, and a recess 16 is located on the left longitudinal edge. These provide for mating of the units in end-to-end, side-to-side, or end-to-side relation to like units to build up larger boards. Although the regular array of end-to-end is preferred with lines of such units abutting in side-to-side array and so locked to form larger platforms, it is also possible to have irregular end-to-side arrangements, for it has been discovered that this is an additional mode which is necessary for optimum working together of childrens' teams.

As can be seen from FIG. 1, taken together with FIG. 1A—a transverse sectional view cut as indicated by arrows A—A in FIG. 1 — the battery well 20 has the form of a semi-cylindrical cavity. The cavity well 20 extends partly above and partly below platform 11 for optimum stability, nesting of the platform units and secure holding of a battery unit. A battery 200 and terminals 201 can be fitted into the well and are frictionally held in end-to-end array, the spring terminals strips 201, 202, and the well ends yielding slightly to allow demountable engagement and release and the sides of the semi-cylindrical well being bowed at the entrance for similar frictional engagement of the battery. The dashed arrows show the relationship of exploded parts.

Two strip terminal grooves 30 are provided adjacent the battery well and perpendicular thereto to accommodate similar terminals 201 which can slide into such grooves in sliding/locking engagement through interlocking. This is shown best in FIG. 1A where it is seen that the groove 30 comprises a descending ramp 301, an ascending locking ramp 303, and overlapping flaps 302. The terminal strip 201 slides in under the flaps 302 and at the same time presses against the ascending ramp 303 for frictional, but demountable, locking and the descending ramp 301 facilitates entry and removal. End wall extensions of the battery well 20 are indicated at 40 and these form the vertical slab mounts for terminal clips 401, which can frictionally clip over such mounts and support electrical load devices, such as a light bulb 402, in electrical contact with a terminal strip 201 in the next adjacent groove 30. A wire 403 can have an end hook through a hole in the clip 401, which will force the wire against 40 to make a secure contact. In a typical case, the other end of the wire would go to the terminal 201 contacting the flat (zinc) terminal of the battery in the battery well 20, and the other end of the terminal strip in the groove 30 contacting the positive point lead of the bulb 402 would have a wire at its outer end connecting it to the positive point terminal 201 of battery 200 in well 20. Two lights can be put in a circuit using both grooves 30 with terminal strips 201 therein, and the student can explore the effects of different loadings in this fashion.

Longitudinally spaced from the above mentioned holders — spacing made feasible by the rectangular form (rather than square) of platform 11 — there are located the further holder means 50, 60, 70.

Two vertical slab-like projections 50 extend upwardly from the platform mount to form a multi-point contact rocker bar mount for elongated rocking member 500, comprising an elongated rocker member, ending in an upright needle, 501 which is perpendicular to the elongated rocker, a pocket 502 and a magnet 503 fitting in the pocket. An electromagnetic coil 504 can be placed around the slabs 50 which help it to hold its form, and the rocker bar 500 can be placed on the mount 50. A sheet of stiff paper, indicated at 600, can be placed in the slabs 60 which will tend to hold it. Paper, cardboard, or other equivalents of stiff paper, can be lettered to provide a meter scale indicating deflection of the needle as rocker bar 500 is moved in response to current passing through the electromagnetic coil 504 — a parameter which the student can vary by adding or subtracting electrical loads in series with the electromagnetic coil and making and breaking the contacts to the power supply in various polarity arrangements. The magnet 503 is held above the plane of the coil 504, the coil resting on platform 11.

An additional degree of freedom for the apparatus is the substitution of a simple circuit board 6011 for the meter face 600. An active or passive element, such as a resistor 602, can have its leads 603 engaged in simple ridges made by tearing the paper. The fold helps to stiffen the paper. Such component can be connected by wires to other elements on the platform unit or on adjacent nested units, or remote units.

A sheet of paper 610 can be placed under (which is shown in broken away form) the unit 10 as a whole — instead of mounting the unit 10 by setting it on a table, and used to devise circuit puzzles as explained more fully in the above cited book. In such puzzles a cut sheet of aluminum foil can be placed inside the fold and wired at its edge to the battery, and the student can insert a half-wired lamp into holes in the folded sheet to define the hidden circuit through experiment and inductive reasoning.

A vial 700 can be filled with electrolyte fluid, capped, and held in well 70, being in good locking frictional engagement therewith through engagement of the walls of the upright cylindrical vial with three locking detents in the well 70, one of which is shown in FIGS. 1 and 1B. The electrochemical experiments can be carried out in the vial 700 or in either of the wells 20 or 70 and include the making of primary batteries from simple couples, e.g., magnesium ribbon and brass clips placed in well 20 in the presence of household bleach electrolyte poured from vial 70. Experiment in plating, electrowinning, electrolyte decomposition, etc., are conveniently carried out in well 70 which the child thinks of as an electrical energy load or sink site (as opposed to well 20 which is the site of primary or secondary energy sources).

Looking at the sectional views of FIG. 1A and FIG. 1B, it can be seen that a cavity 19 is enclosed underneath the platform 11 and surrounded by the edge supporting wall 12.

The apparatus units have a low profile, and are readily nestable, and rest quite stably on a table surface. They can also be used off the table, as indicated in FIG. 1 with respect to the use of a sheet of paper 610 therewith, using the cavity 19 to conceal additional elements. In such handling the locking features of all the holders on the top side of the platform 11 is used to good advantage. However, such locking features, consistent with demoutability, are important in working on table surfaces to avoid upset of experiments and consequent frustration of the learning process.

It is evident that those skilled in the art may now make numerous uses and modifications of, and departures from the specific embodiments described herein without departing from the inventive concepts. Consequently, the invention is to be construed as embracing each and every novel feature and novel combination of features present in, or possessed by the apparatus and techniques herein disclosed and limited solely by the scope and spirit of the appended claims.

What is claimed is:

1. Educational/demonstration apparatus for illustrating fundamentals of electricity, magnetism and electrochemistry comprising at least one circuit board unit comprised of,
   means forming a raised platform mount and comprising means forming a platform mount and support means constructed and arranged to rest on a flat horizontal surface and support said platform mount at a raised height therefrom and essentially parallel thereto, and being constructed and arranged with edge connecting means for mating edge to edge, with like mount means in demountable locking manner.
   means forming a battery well extending above and below the platform mount, when the latter is horizontally arranged, and being constructed and arranged to hold a dry cell cylindrical battery and end terminals therefor demountable in self-locking manner
   means forming at least one terminal holding groove on the platform mount and being constructed and arranged to hold a metal terminal strip in demountable, self-locking relation,
   means forming at least one raised terminal mount above the platform mount and constructed and arranged to hold a terminal clip above the platform mount in demountable, self-locking relation closely spaced to said groove so that the terminal clip can support an electrical load device in contact with said terminal strip,
   means forming a multi-seat rocking mount for an elongated rocker member resting horizontally on said multiple seats,
   means forming a fluid well extending downwardly from said platform mount,
   and means forming a holder for supporting a folded stiff paper sheet orthogonally with respect to the direction of elongation of said elongated rocker member.

2. The apparatus of claim 1 further comprising, in combination therewith,
   at least one each of said battery terminal strip, terminal clip, rocking bar and cylindrical member and wiring for interconnecting the same to form a flexible teaching-demonstration unit.

3. The apparatus of claim 1 as a single thermoplastic sheet integrally forming the aforesaid means.

4. Apparatus in accordance with claim 3 wherein the said raised platform mount means comprises a continuous platform with a turned edge portion to comprise the support therefor and form an enclosed lower cavity nestable with the tops of like apparatus.

5. Apparatus in accordance with claim 4 wherein the said platform mount is of elongated rectangular form with the battery well extending longitudinally thereof in the form of a semi-cylinder with the said terminal strip groove and terminal clip mount extending transverse to the said longitudinal direction and being adjacent the battery well,
   and wherein the said rocking mounts and paper holder have the form of vertical slabs which are parallel to each other and arranged in a line at a short end of said rectangular platform, which line is transverse to said longitudinal direction,
   and wherein the edge locking means are constructed to provide locking to like units in any direction of contact whether end-to-end, side-to-side or end-to-side.

6. Apparatus in accordance with claim 5 wherein two of said terminal strips and two of said terminal clip mounts are provided,
   the terminal clip mounts being extensions of end wall portions of said battery well above the platform.

7. Apparatus in accordance with claim 5 wherein the rocking bar mount comprises two spaced slabs with the said electrolyte well disposed therebetween, the platform providing room for an electromagnetic coil to surround said slabs.

* * * * *